(12) United States Patent
Michalo et al.

(10) Patent No.: US 7,300,030 B2
(45) Date of Patent: Nov. 27, 2007

(54) ADJUSTABLE MOUNTING BRACKET

(75) Inventors: Richard Scott Michalo, Beavercreek, OH (US); Joseph John Simon, Plainfield, IL (US)

(73) Assignee: American Rescue Technology, Inc., Kettering, OH (US)

( * ) Notice: Subject to any disclaimer, the term of this patent is extended or adjusted under 35 U.S.C. 154(b) by 24 days.

(21) Appl. No.: 11/246,660

(22) Filed: Oct. 7, 2005

(65) Prior Publication Data
US 2007/0080273 A1 Apr. 12, 2007

(51) Int. Cl.
*A47F 5/00* (2006.01)

(52) U.S. Cl. ............... 248/309.1; 248/316.2; 248/292.12

(58) Field of Classification Search ............. 248/309.1, 248/310, 314, 316.2, 311.2, 292.12, 289.11
See application file for complete search history.

(56) References Cited
U.S. PATENT DOCUMENTS

| | | | |
|---|---|---|---|
| 221,965 A | 11/1879 | Judd | |
| 364,351 A | 6/1887 | Ingraham et al. | |
| 576,769 A | 2/1897 | Williams | |
| 764,111 A | 7/1904 | Clark | |
| 1,197,012 A | 9/1916 | Conlin | |
| 1,995,656 A | 3/1935 | Stout | |
| 3,144,232 A | 8/1964 | Smootz | |
| 4,878,642 A * | 11/1989 | Kirby, Jr. | 248/311.2 |
| 5,037,046 A | 8/1991 | Mingledorff, Jr. | |
| 5,794,671 A | 8/1998 | Smith | |
| 5,996,957 A * | 12/1999 | Kurtz | 248/311.2 |
| 6,079,682 A | 6/2000 | Olkkola | |
| 6,669,155 B2 | 12/2003 | Ron | |
| 6,983,918 B1 * | 1/2006 | Leasure | 248/311.2 |
| 2006/0102823 A1 * | 5/2006 | Carnevali | 248/534 |

* cited by examiner

*Primary Examiner*—Ramon O Ramirez
(74) *Attorney, Agent, or Firm*—Thompson Hine LLP

(57) ABSTRACT

An adjustable mounting bracket for securely storing a tool including a receiving member having a plurality of gear-like teeth, wherein the receiving member includes a frame that defines an opening for closely receiving the tool, and a mounting member having a base and an engaging portion, wherein the engaging portion is adapted to mesh with the plurality of gear-like teeth.

10 Claims, 9 Drawing Sheets

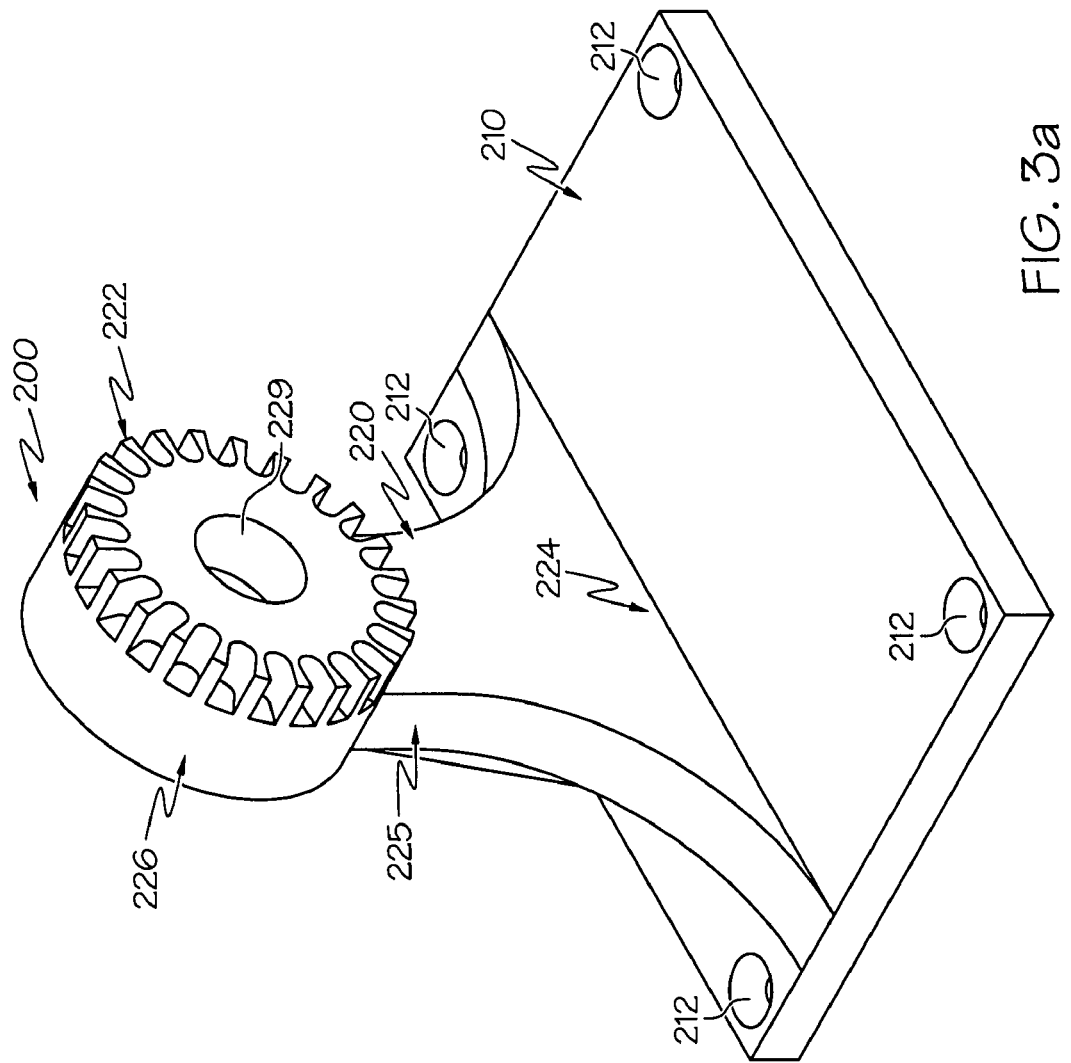

ADJUSTABLE MOUNTING BRACKET

BACKGROUND

The present application relates to mounting devices and, more particularly, adjustable mounting brackets.

With the increased number of vehicles traveling on the highways, there is an increased risk of accidents. Many drivers store heavy objects or tools in their vehicles, especially work related vehicles that transport tools to a job site. Such tools may be stored in various compartments in or on the vehicles. Police, fireman and emergency medical teams often carry heavy tools in their vehicles, such as the S60-XL spreader available from Genesis Rescue Systems and other rescue tools and equipment. If such a vehicle accelerates, decelerates, shifts, maneuvers or is in an accident, the heavy tools and equipment may shift and cause injury to the driver and/or passengers.

Various mounting devices have been developed for use in vehicles. For example, mounting devices for storing baskets and cellular telephones are discussed in U.S. Pat. No. 1,995,656 to Stout, U.S. Pat. No. 6,079,682 to Olkkola and U.S. Pat. No. 6,669,155 to Ron, the entire contents of which are incorporated herein by reference. However, such mounting devices are not adapted to securely store tools and equipment.

Accordingly, there is a need for a safe and sturdy mounting bracket for storing and transporting tools, equipment and other heavy objects in a vehicle. Furthermore, there is a need for a mounting bracket for storing tools and the like in a ready-to-use state.

SUMMARY

In one aspect, the adjustable mounting bracket includes a receiving member having a plurality of gear-like teeth, wherein the receiving member includes a hollow frame that defines an opening for closely receiving a tool, and a mounting member having a base and an engaging portion, wherein the engaging portion is adapted to mesh with the plurality of gear-like teeth.

In another aspect, the adjustable mounting bracket includes a receiving member having a plurality of gear-like teeth, wherein the receiving member includes a frame that defines an opening for closely receiving a tool, a mounting member having a base and an engaging portion, wherein the engaging portion is adapted to mesh with the plurality of gear-like teeth, and a linking member having a first end and a second end, wherein the first end is connected to the receiving member or the mounting member and the second end is adapted to engage the tool.

In another aspect, a method for storing a tool in a mounting bracket having a mounting member, a receiving member and a linking member, wherein said receiving member includes a frame that defines an opening for closely receiving said tool, is provided. The method includes the steps of rotating the receiving member with respect to the mounting member to obtain a desired angle of the receiving member relative to the mounting member, mating the receiving member with the mounting member, thereby securing the receiving member at the desired angle with respect to the mounting member, placing the tool into the opening of the receiving member, and connecting a first end of the linking member to the receiving member and connecting a second end of the linking member to the tool.

Other aspects of the adjustable mounting bracket will become apparent from the following description, the accompanying drawings and the appended claims.

BRIEF DESCRIPTION OF THE DRAWINGS

FIG. 2b is a front elevational view of the receiving member of FIG. 2a;

FIG. 2c is a side elevational view of the receiving member of FIG. 2a;

FIG. 3a is a front perspective view of a mounting member of the adjustable mounting bracket of FIG. 1;

FIG. 3b is a front elevational view of the mounting member of FIG. 3a;

FIG. 3c is a side elevational view of the mounting member of FIG. 3a;

DETAILED DESCRIPTION

Figure 1:
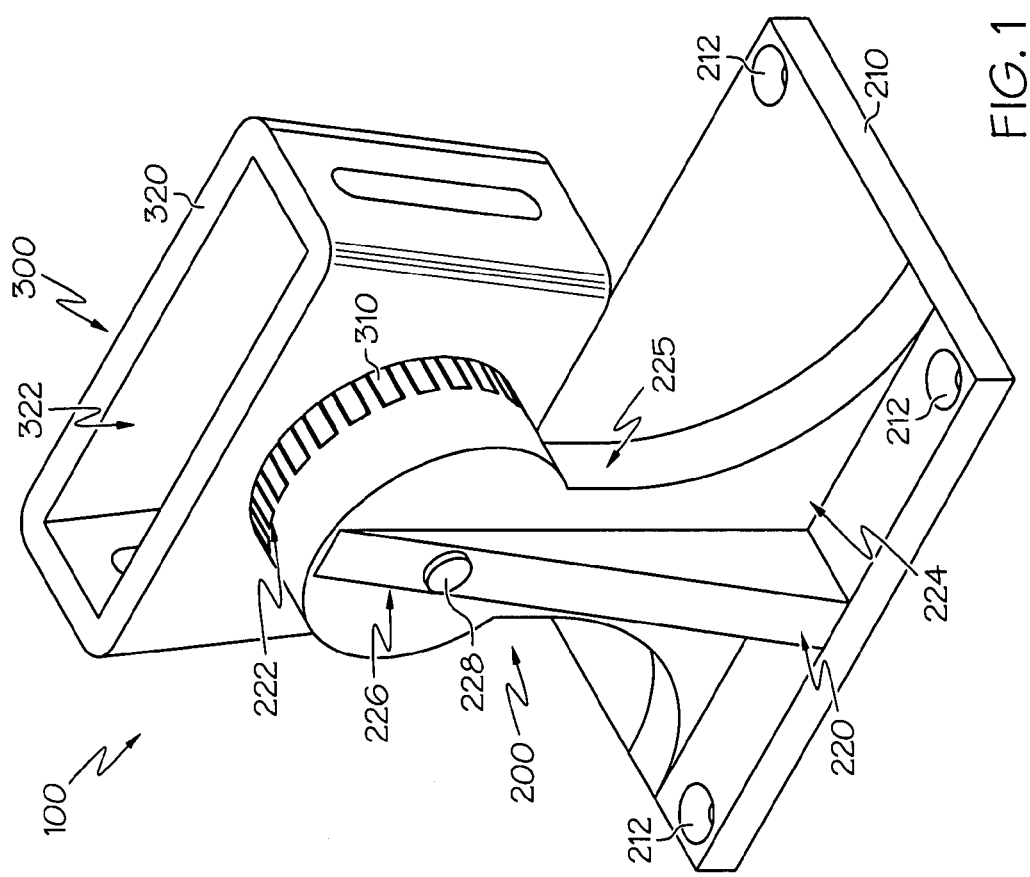
FIG. 1 is a perspective view of one aspect of the adjustable mounting bracket.
Figure 4:
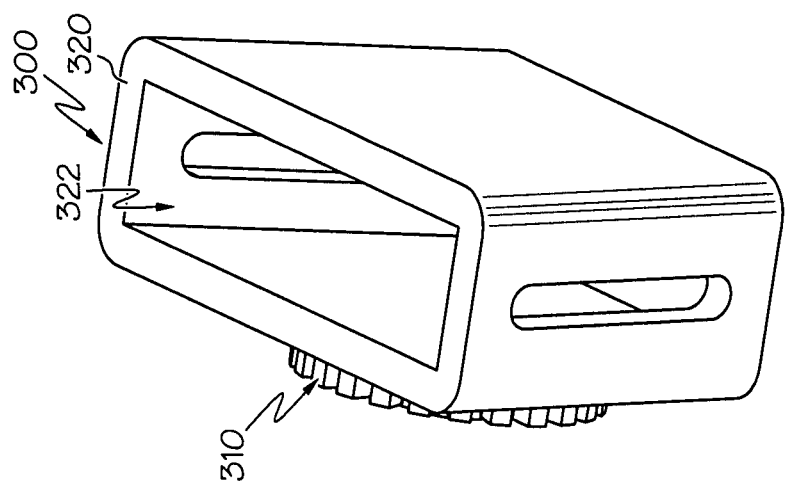
FIG. 4 is an exploded perspective view of the adjustable mounting bracket of FIG. 1.
Figure 4:
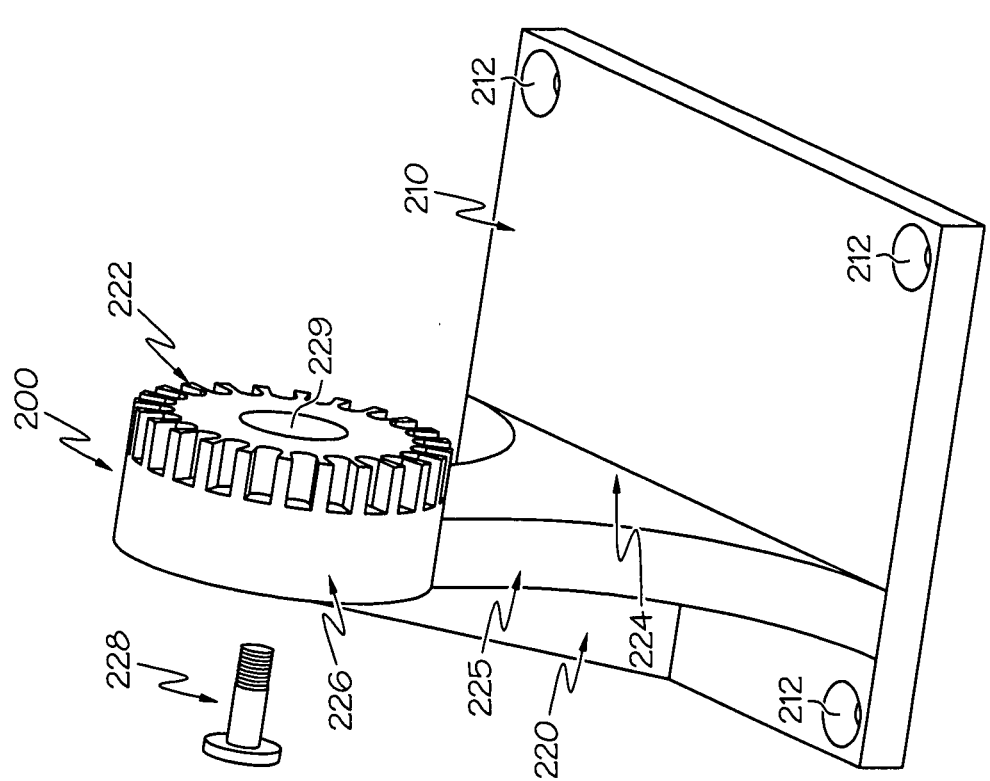
Figure 5:
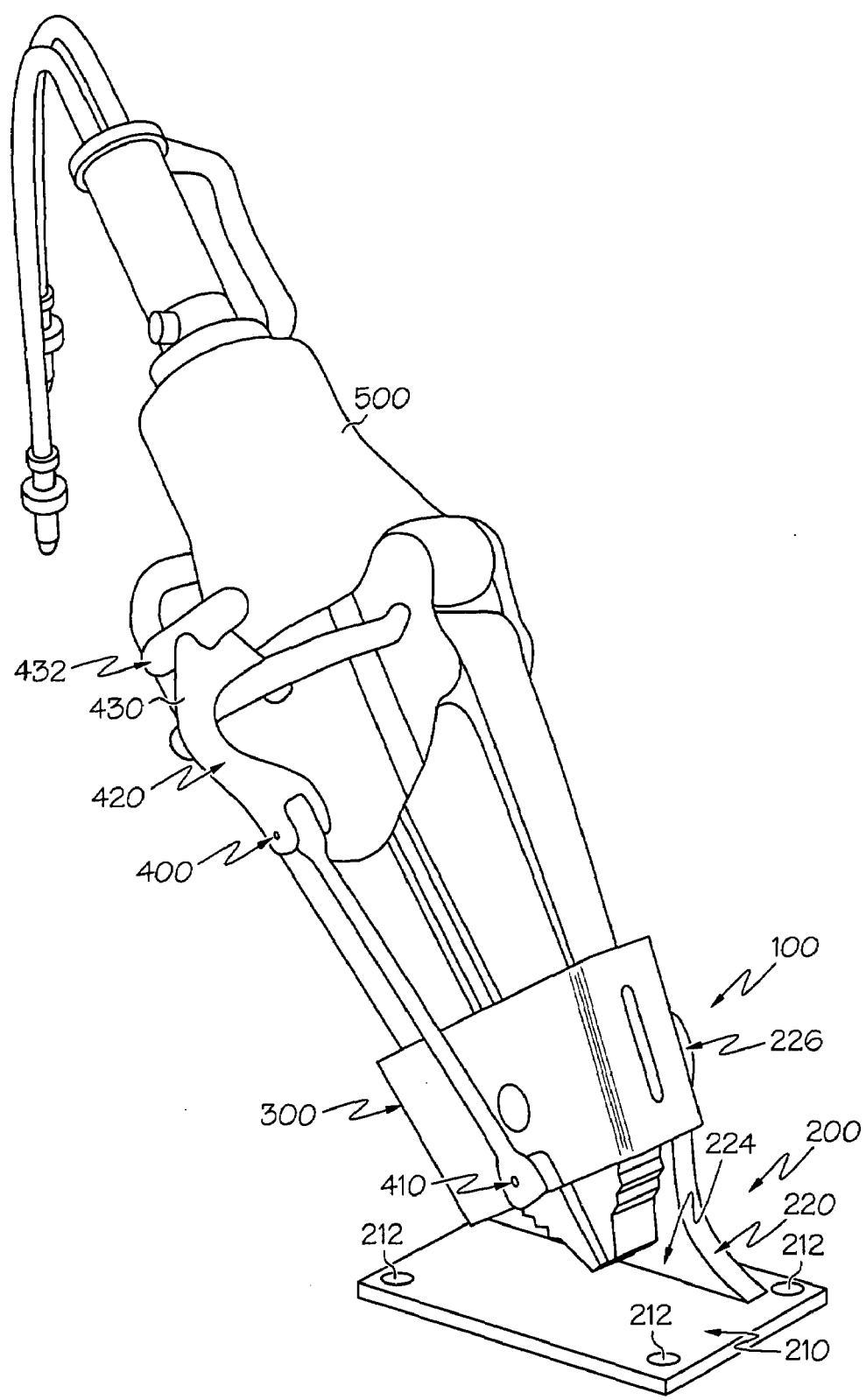
FIG. 5 is a perspective view of the adjustable mounting bracket of FIG. 1 having a tool secured therein.

As shown in FIGS. 1 and 4, one aspect of the adjustable mounting bracket, generally designated 100, may include a mounting member 200, a receiving member 300 and a connecting device 228. The receiving member 300 may be adapted to releaseably engage the mounting member 200 and the connecting device 228 may secure the receiving member 300 to the mounting member 200. In another aspect, as shown in FIG. 5, the adjustable mounting bracket 100 may additionally include a linking member 400 for securing a tool 500 (e.g., a mechanical spreader or other device) or other device into engagement with the receiving member 300.

The adjustable mounting bracket 100 may be made of any material capable of supporting the weight of the tool 500 when the tool 500 is stored in the receiving member 300. In one aspect, the adjustable mounting bracket 100 may be made from metal, metal alloys, wood, stone, polymeric materials or combinations thereof.

Figure 3B:
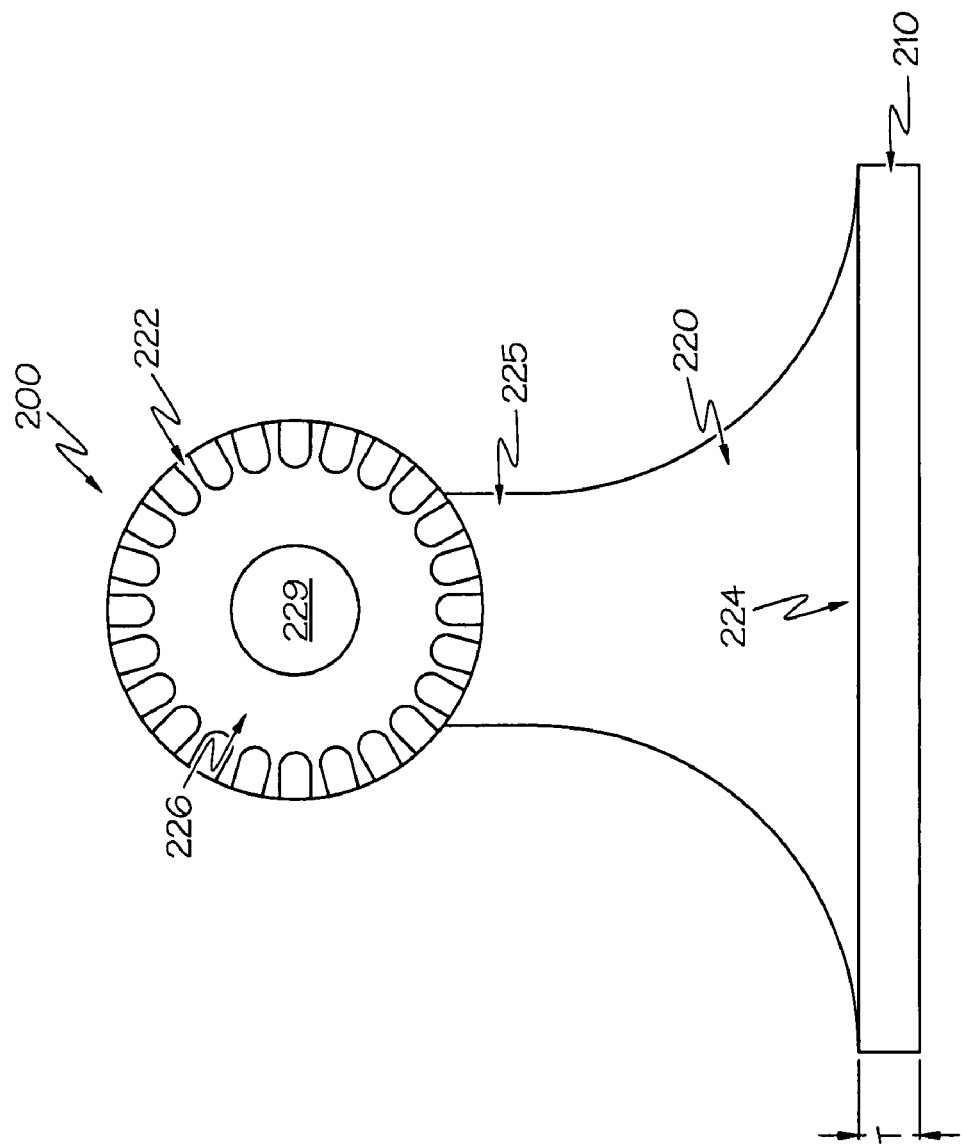
Figure 3C:
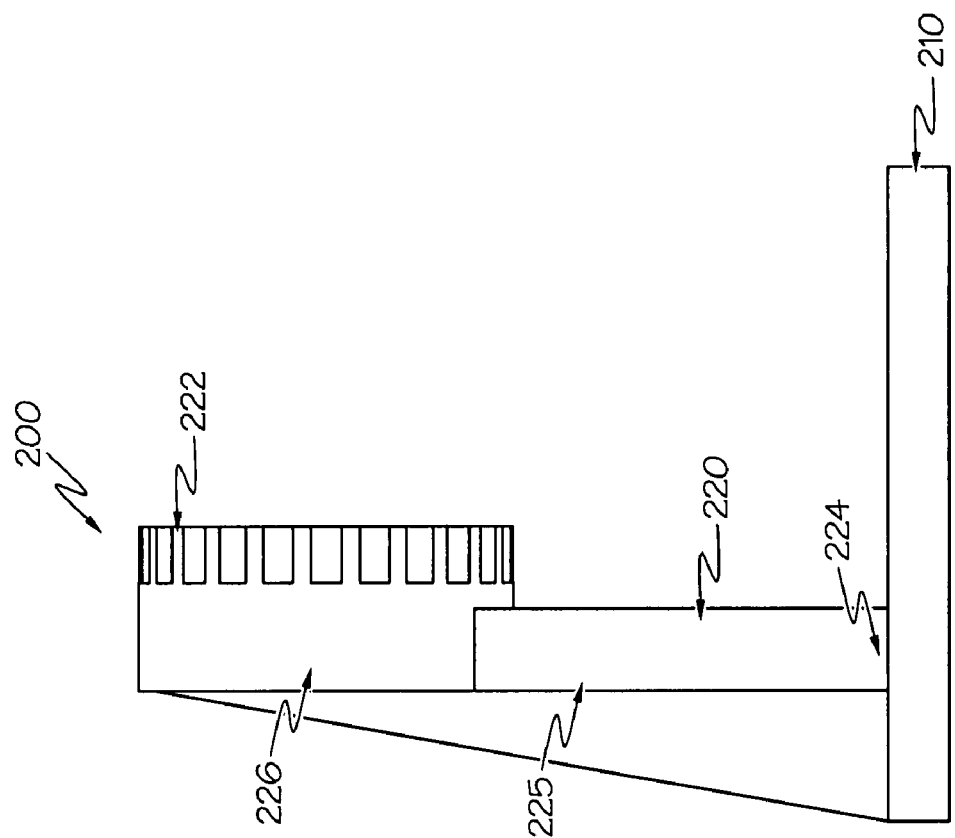

As shown in FIGS. 3a, 3b and 3c, the mounting member 200 may include a base 210, a support arm 220 and an engaging portion 226. The base 210 may be adapted to engage a mounting surface (not shown), such as a table, a workbench, a floor, a wall or any other surface to which the adjustable mounting bracket 100 may be secured. The base 210 may be generally flat and may have a thickness T (see FIG. 3b) sufficient to provide rigidity and strength necessary to support the weight of the tool 500. In one aspect, the base 210 may be generally rectangular in top view. Alternatively, the base 210 may have any shape, thickness and/or contour such that the base 210 is capable of being secured to a mounting surface.

As shown in FIG. 3a, the base 210 may include one or more mounting holes 212 adapted to receive screws, bolts or the like therethrough such that the base 210 may be securely attached to the mounting surface. Alternatively, the base 210 may be attached to the mounting surface by adhesives, welds, rivets, nails, clips, clasps or any other known attachment devices and mechanisms. At this point, those skilled in the art should appreciate that the base 210 may be attached to a mounting surface by any technique known in the art.

The support arm 220 may include a first end 224 and a second end 225. The first end 224 of the support arm 220 may be connected to the base 210 and the second end 225 of the support arm 220 may be connected to the engaging portion 226, thereby securely connecting the engaging portion 226 to the base 210. The support arm 220 may be connected to the base 210 and the engaging portion 226 by soldering, welding, screwing, bolting or the like. Alternatively, the entire (or only a portion of the) mounting member 200 may be formed, cast and/or forged from a single piece of material.

The engaging portion 226 may include an opening 229 and a plurality of gear-like teeth 222 arranged in a generally circular pattern. The teeth 222 may be arranged such that their shape is symmetrical about a single plane and/or such that the teeth 222 are equidistantly spaced about the engaging portion 226. In one aspect, the engaging portion 226 may include about 2 to about 2000 teeth 222. In another aspect, the engaging portion 226 may include about 10 to about 100 teeth 222.

Figure 2A:
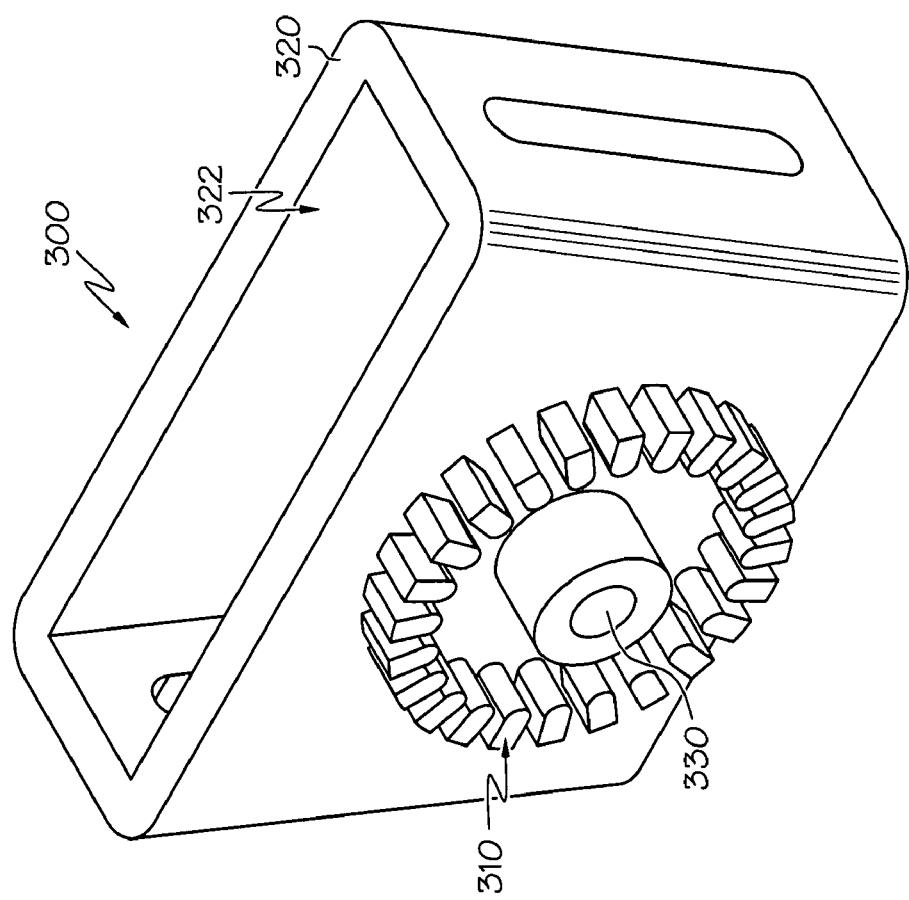
FIG. 2a is a front perspective view of a receiving member of the adjustable mounting bracket of FIG. 1.
Figure 2B:
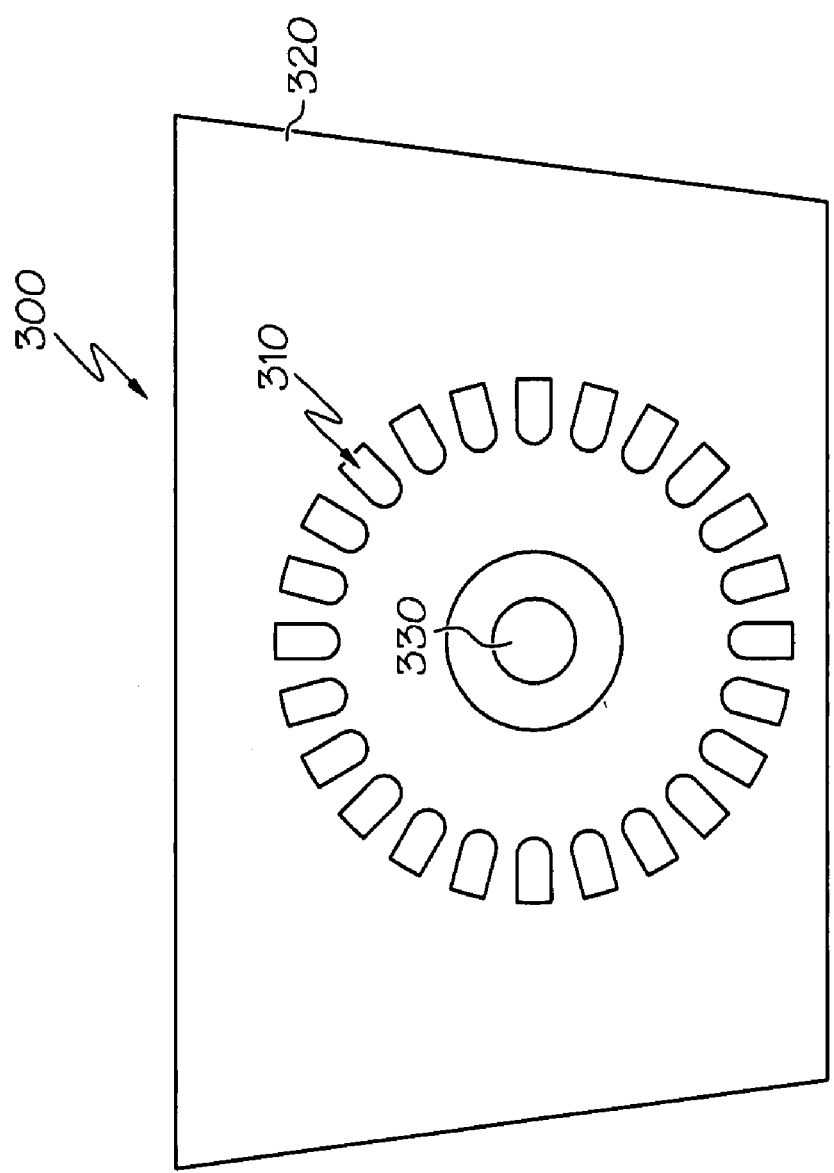
Figure 2C:
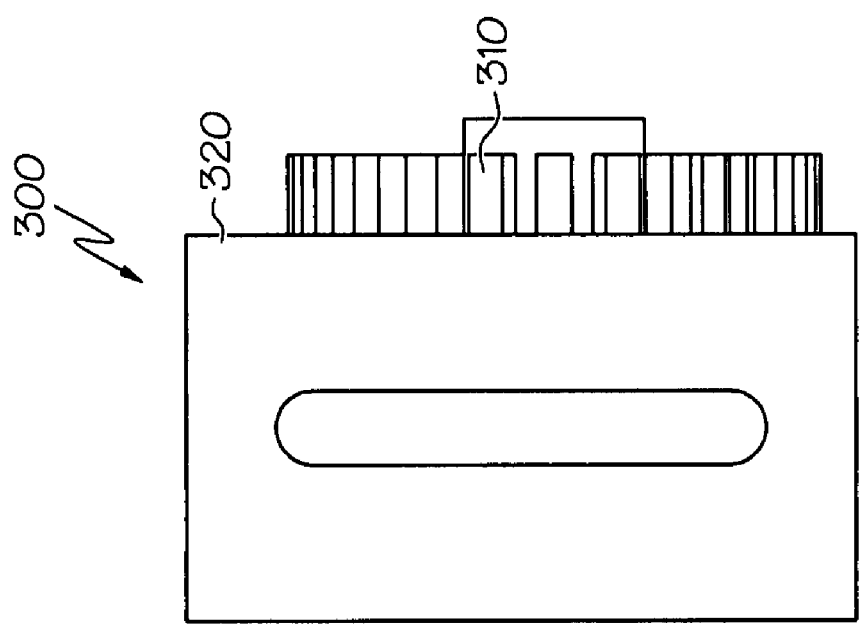

As shown in FIGS. 2a, 2b and 2c, the receiving member 300 may include a frame 320, a recess 330 and a set of gear-like teeth 310 adapted to engage the teeth 222 on the mounting member 200. The receiving member 300 may be made from similar materials as the mounting member 200 and may be constructed in a similar way.

The frame 320 may be generally circular, oval, rectangular, square, diamond, D-shaped, or the like in top view and may define a passage, hole, recess or opening 322 therein, wherein the opening 322 is adapted to receive the tool 500, as shown in FIG. 5. In one aspect, the walls of the frame 320 may be tapered and/or contoured such that the tool 500 may be closely received within the opening 322. At this point, those skilled in the art should appreciate that the shape and contour of the frame 320 may be dictated by the shape and contour of the tool 500 to be stored within the frame 320.

The teeth 310 may be connected to and/or may extend from the frame 320. The teeth 310 may be sized and shaped to engage and/or mate with the teeth 222 of the mounting member 200 such that the receiving member 300 may be connected to the mounting member 200, as shown in FIG. 1, without allowing rotation of the receiving member 300 relative to the mounting member 200 portion when the receiving member 300 is securely connected to the mounting member 200 (e.g., by connecting device 228). The connecting device 228 (e.g., a screw, a bolt or the like) may be received through the opening 229 in the engaging portion 226 of the mounting member 200 (see FIGS. 1, 3a, 3b and 4) and may engage the recess 330 (e.g., a threaded recess) in the receiving member 300(see FIGS. 2a and 2b), such that the receiving member 300 may be secured to the mounting member 200.

The angle of the receiving member 300 relative to the mounting member 200 may be adjusted by disengaging the teeth 310 on the receiving member 300 from the teeth 222 on the mounting member 200, rotating the receiving member 300 to the desired angle with respect to the mounting member 200, reengaging the teeth 310 with the teeth 222, and securing the receiving member 300 to the mounting member 200 with the connecting device 228. At this point, those skilled in the art will appreciate that additional angles of the receiving member 300 with respect to the mounting member 200 may be achieved by providing additional teeth 310, 222. Furthermore, those skilled in the art will appreciate that the size, shape and number of teeth 310, 222 may be adjusted depending on the size and weight of the tool 500 to be stored within the adjustable mounting bracket 100.

As shown in FIG. 5, the linking member 400 may include a first end 410 and a second end 420. The second end 420 may include an engaging device 430 such as a hook, a clamp or the like having a gripping portion 432. The gripping portion 432 may be adapted to facilitate grasping the linking member 400 and securing the engaging device 430 onto a flange, a handle, a recess or other surface of the tool 500.

The first end 410 of the linking member 400 may be connected to the adjustable mounting bracket 100 and the second end 420 may be connected to the tool 500 by, for example, the engaging device 430, thereby urging the tool 500 into engagement with the receiving member 300. The linking member 400 may be a spring, a bungee cord, an elastic, a flexible rubber, Velcro, a strap or cord, a ratcheting strap or any other device or material capable of urging the tool 500 into engagement with the receiving member 300.

Accordingly, the adjustable mounting bracket 100 may be secured to a mounting surface, as described above, the angle of the receiving member 300 with respect to the mounting member 200 may be adjusted, as described above, and a tool 500 may be securely stored within the adjustable mounting bracket 100, as described above, thereby allowing the tool 500 to be safely stored and transported.

Although the adjustable mounting bracket has been shown and described with respect to certain aspects, it should be understood that modifications may occur to those skilled in the art upon reading the specification. The adjustable mounting bracket includes all such modifications and is limited only by the scope of the claims.

What is claimed is:

1. An adjustable mounting bracket for securely storing a tool comprising:
   a receiving member having a plurality of gear-like teeth, wherein said receiving member includes a frame that defines an opening for closely receiving said tool;
   a mounting member having a base and an engaging portion, wherein said engaging portion is adapted to mesh with said plurality of gear-like teeth; and
   a linking member having a first end and a second end, wherein said first end is connected to at least one of said receiving member and said mounting member and said second end is adapted to engage said tool.

2. The adjustable mounting bracket of claim 1, wherein said linking member includes an elastic material.

3. The adjustable mounting bracket of claim 1, wherein said linking member includes a hook connected to said second end.

4. The adjustable mounting bracket of claim 3, wherein said hook includes a gripping portion.

5. The adjustable mounting bracket of claim 1, wherein said frame is tapered to closely receive said tool.

6. The adjustable mounting bracket of claim 1, wherein said base is adapted to engage a mounting surface.

7. The adjustable mounting bracket of claim 1, wherein said plurality of gear-like teeth are equidistantly spaced in a generally circular configuration.

8. The adjustable mounting bracket of claim 1, wherein said engaging portion includes a plurality of gear-like teeth adapted to engage said plurality of gear-like teeth of said receiving member.

9. A method for storing a tool in a mounting bracket having a mounting member, a receiving member and a linking member, wherein said receiving member includes a frame that defines an opening for closely receiving said tool, said method comprising the steps of:

rotating said receiving member with respect to said mounting member to obtain a desired angle of said receiving member relative to said mounting member;

mating said receiving member with said mounting member, thereby securing said receiving member at said desired angle with respect to said mounting member;

placing said tool into said opening of said receiving member; and connecting a first end of said linking member to said receiving member and connecting a second end of said linking member to said tool.

10. The method of claim 9, further comprising the step of securing said mounting member to a mounting surface.

* * * * *